(12) United States Patent
Heo et al.

(10) Patent No.: US 12,199,306 B2
(45) Date of Patent: Jan. 14, 2025

(54) SEPARATOR FOR ELECTROCHEMICAL DEVICE AND ELECTROCHEMICAL DEVICE COMPRISING SAME

(71) Applicant: LG ENERGY SOLUTION, LTD., Seoul (KR)

(72) Inventors: Jin-Woo Heo, Daejeon (KR); Hye-Jin Kwon, Daejeon (KR); Su-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 224 days.

(21) Appl. No.: 17/774,903

(22) PCT Filed: Nov. 17, 2020

(86) PCT No.: PCT/KR2020/016204
§ 371 (c)(1),
(2) Date: May 6, 2022

(87) PCT Pub. No.: WO2021/101221
PCT Pub. Date: May 27, 2021

(65) Prior Publication Data
US 2022/0407181 A1 Dec. 22, 2022

(30) Foreign Application Priority Data
Nov. 18, 2019 (KR) .................. 10-2019-0148060

(51) Int. Cl.
*H01M 50/446* (2021.01)
*H01M 50/403* (2021.01)
(Continued)

(52) U.S. Cl.
CPC ....... *H01M 50/446* (2021.01); *H01M 50/403* (2021.01); *H01M 50/426* (2021.01); *H01M 50/449* (2021.01)

(58) Field of Classification Search
CPC ............ H01M 50/446; H01M 50/403; H01M 50/426; H01M 50/449
See application file for complete search history.

(56) References Cited

U.S. PATENT DOCUMENTS

| 6,261,721 B1 | 7/2001 | Andrieu et al. |
| 2011/0305941 A1 | 12/2011 | Park et al. |
| (Continued) | | |

FOREIGN PATENT DOCUMENTS

| CN | 109309185 A | 2/2019 |
| EP | 2 662 912 A1 | 11/2013 |
| (Continued) | | |

OTHER PUBLICATIONS

Alteo "Specialty Aluminas for Technical Ceramics" 2018 Technical Brochure.*

(Continued)

*Primary Examiner* — Robert S Walters, Jr.
(74) *Attorney, Agent, or Firm* — Birch, Stewart, Kolasch & Birch, LLP (57) ABSTRACT

A method for manufacturing a separator for an electrochemical device which uses polyvinyl pyrrolidone (PVP) as a dispersing agent, and provides high dispersibility of particles and prevents aggregation of particles, even when inorganic particles having a small particle diameter is used in slurry for forming a porous coating layer. Therefore, the inorganic particles are distributed homogeneously in the porous coating layer of a finished separator. In addition, since PVP is used with a fluorinated binder resin, the separator shows improved peel strength and adhesion to an electrode. Further, a non-solvent ingredient for the fluorinated binder resin is used as a solvent for PVP, and a non-solvent ingredient for PVP is used as a solvent for the fluorinated binder resin.

10 Claims, 1 Drawing Sheet

(51) Int. Cl.
   *H01M 50/426*   (2021.01)
   *H01M 50/449*   (2021.01)

(56) References Cited

U.S. PATENT DOCUMENTS

| | | | |
|---|---|---|---|
| 2013/0101885 A1 | 4/2013 | Lee et al. | |
| 2014/0295285 A1 | 10/2014 | Lee et al. | |
| 2018/0034025 A1 | 2/2018 | Lee et al. | |
| 2019/0131604 A1 | 5/2019 | Yoon et al. | |
| 2020/0014010 A1 | 1/2020 | Kwon et al. | |
| 2021/0249734 A1* | 8/2021 | Kwon ................ | H01M 50/431 |

FOREIGN PATENT DOCUMENTS

| | | | | |
|---|---|---|---|---|
| EP | 3 832 756 A1 | 6/2021 | | |
| KR | 10-2012-0025575 A | 3/2012 | | |
| KR | 10-2014-0060796 A | 5/2014 | | |
| KR | 10-1661671 B1 | 8/2016 | | |
| KR | 10-2017-0037566 A | 4/2017 | | |
| KR | 10-2017-0073712 A | 6/2017 | | |
| KR | 10-2017-0093606 A | 8/2017 | | |
| KR | 10-2018-0018408 A | 2/2018 | | |
| KR | 10-2019-0060717 A | 6/2019 | | |
| KR | 10-2028113 B1 | 10/2019 | | |
| KR | 10-2019-0140870 A | 12/2019 | | |
| WO | WO-2020197102 A1 * | 10/2020 | .......... | H01M 10/052 |

OTHER PUBLICATIONS

Extended European Patent Office Search Report dated Nov. 3, 2022 for European Patent Application No. 20889799.1.
International Search Report (PCT/ISA/210) issued in PCT/KR2020/016204 mailed on Feb. 25, 2021.

* cited by examiner

SEPARATOR FOR ELECTROCHEMICAL DEVICE AND ELECTROCHEMICAL DEVICE COMPRISING SAME

TECHNICAL FIELD

The present application claims priority to Korean Patent Application No. 10-2019-0148060 filed on Nov. 18, 2019 in the Republic of Korea. The present disclosure relates to a method for manufacturing a separator for an electrochemical device and a separator obtained therefrom. Particularly, the present disclosure relates to a method for preparing a separator including inorganic particles distributed homogeneously therein and having improved peel strength between a separator substrate and a porous coating layer and adhesion between the separator and an electrode.

BACKGROUND ART

As technological development and needs for mobile instruments have been increased, secondary batteries as energy sources have been in rapidly increasingly in demand. Recently, use of secondary batteries as power sources for electric vehicles (EV), hybrid electric vehicles (HEV), or the like, have been realized. Accordingly, active studies have been conducted about secondary batteries capable of meeting various needs. Particularly, there is a high need for lithium secondary batteries having high energy density, high discharge voltage and output stability. More particularly, it is required for lithium secondary batteries used as power sources for electric vehicles and hybrid electric vehicles to have high output characteristics so that they may realize a high output in a short time. A polyolefin-based microporous film used conventionally as a separator for an electrochemical device shows a severe heat shrinking behavior at a temperature of 100° C. or higher due to its material property and a characteristic during its manufacturing process, including orientation, thereby causing a short-circuit between a positive electrode and a negative electrode. Recently, to solve the above-mentioned problem, there has been suggested a separator having a porous coating layer including a mixture of inorganic particles and a binder polymer and formed on at least one surface of a separator substrate having a plurality of pores. When the inorganic particles in the porous coating layer have a large diameter, the separator shows low surface uniformity to cause degradation of peel strength or adhesion to an electrode. In addition, the inorganic particles may be detached from the porous coating layer with ease. To prevent this, inorganic particles having a small particle diameter are used preferably. However, as the diameter of inorganic particles is decreased, dispersibility of the inorganic particles in slurry is lowered and aggregation of the inorganic particles occurs to cause degradation of processability during a manufacturing process. In addition, in a finally formed separator, the inorganic particles may not be distributed homogeneously in the porous coating layer or large agglomerates of the particles may be present, resulting in degradation of surface uniformity and a difficulty in ensuring uniform ion conductivity over the whole surface of the separator. Therefore, there is a need for developing a novel method for manufacturing a separator using inorganic particles having a small particle diameter.

DISCLOSURE

Technical Problem

The present disclosure is designed to solve the problems of the related art, and therefore the present disclosure is directed to providing a method for manufacturing a separator which ensures uniform distribution of inorganic particles and shows improved peel strength and adhesion to an electrode. The present disclosure is also directed to providing a method for manufacturing a separator, which allows easy formation of an adhesive portion through humidified phase separation. It will be easily understood that the objects and advantages of the present disclosure may be realized by the means shown in the appended claims and combinations thereof.

Technical Solution

According to the first embodiment of the present disclosure, there is provided a method for manufacturing a separator for an electrochemical device, including the steps of:
preparing a first polymer solution and a second polymer solution;
mixing the first polymer solution with the second polymer solution to prepare a third polymer solution, and adding inorganic particles to the third polymer solution to prepare slurry for forming a porous coating layer; and
applying the slurry for forming the porous coating layer to at least one surface of a porous separator substrate, drying the porous coating layer, to obtain the separator including the porous separator substrate and the porous coating layer on at least one surface of the porous separator substrate,
wherein the first polymer solution includes a first binder resin and a first solvent,
wherein the second polymer solution includes a second binder resin and a second solvent, and
wherein the first binder resin includes a fluorinated binder resin, the second binder resin includes polyvinyl pyrrolidone (PVP), the first solvent is a non-solvent for the second binder resin, and the second solvent is a non-solvent for the first binder resin.

According to the second embodiment of the present disclosure, there is provided the method for manufacturing a separator for an electrochemical device as defined in the first embodiment, wherein the fluorinated binder resin includes a polyvinylidene fluoride (PVdF)-containing polymer, and the PVdF-containing polymer includes at least one selected from the group consisting of polyvinylidene fluoride homopolymer, polyvinylidene fluoride-co-hexafluoropropylene, polyvinylidene fluoride-co-trichloroethylene and polyvinylidene fluoride-co-chlorotrifluoroethylene.

According to the third embodiment of the present disclosure, there is provided the method for manufacturing a separator for an electrochemical device as defined in the first or the second embodiment, wherein the first solvent includes a ketone-containing solvent.

According to the fourth embodiment of the present disclosure, there is provided the method for manufacturing a separator for an electrochemical device as defined in any one of the first to the third embodiments, wherein the second solvent includes at least one selected from water, methanol, ethanol, propyl alcohol, butyl alcohol, butanediol, ethylene glycol, propylene glycol and tripropylene glycol.

According to the fifth embodiment of the present disclosure, there is provided the method for manufacturing a separator for an electrochemical device as defined in any one of the first to the fourth embodiments, wherein the first binder resin has a molecular weight (Mw) of 100,000-2,000,000.

According to the sixth embodiment of the present disclosure, there is provided the method for manufacturing a separator for an electrochemical device as defined in any one of the first to the fifth embodiments, wherein the slurry for forming a porous coating layer includes a weight ratio of the binder resin to the inorganic particles of 50:50 to 1:99, and the binder resin includes the first binder resin and the second binder resin.

According to the seventh embodiment of the present disclosure, there is provided the method for manufacturing a separator for an electrochemical device as defined in any one of the first to the sixth embodiments, wherein the slurry for forming a porous coating layer further includes at least one third binder resin selected from the group consisting of polyacrylonitrile, polyvinyl acetate, polyethylene-co-vinyl acetate, polyethylene oxide, polyarylate, cyanoethyl pullulan, cyanoethyl polyvinyl alcohol, cyanoethyl cellulose, cyanoethyl sucrose and pullulan.

According to the eighth embodiment of the present disclosure, there is provided the method for manufacturing a separator for an electrochemical device as defined in any one of the first to the seventh embodiments, wherein the second binder resin has a molecular weight (Mw) of 500,000-5,000,000.

According to the ninth embodiment of the present disclosure, there is provided the method for manufacturing a separator for an electrochemical device as defined in any one of the first to the eighth embodiments, wherein the inorganic particles have a diameter ($D_{50}$) of 10 nm to 1 μm.

According to the tenth embodiment of the present disclosure, there is provided the method for manufacturing a separator for an electrochemical device as defined in any one of the first to the ninth embodiments, wherein the drying is carried out at a relative humidity of 40-80%.

Advantageous Effects

The method for manufacturing a separator according to an embodiment of the present disclosure uses polyvinyl pyrrolidone (PVP) functioning as a dispersing agent, and thus provides high dispersibility of particles and prevents aggregation of particles, even when inorganic particles having a small particle diameter is used in slurry for forming a porous coating layer. Therefore, the inorganic particles are distributed homogeneously in the porous coating layer of a finished separator.

In addition, since PVP is used in combination with a fluorinated binder resin as a binder resin for the porous coating layer, the separator shows improved peel strength and adhesion to an electrode.

Further, a non-solvent ingredient for the fluorinated binder resin is used as a solvent for PVP, and a non-solvent ingredient for PVP is used as a solvent for the fluorinated binder resin. As a result, while the porous coating layer is dried under a humidified condition, phase separation of the binder resin in the porous coating layer is induced well, and thus formation of an adhesive portion on the surface portion of the porous coating layer is accelerated.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
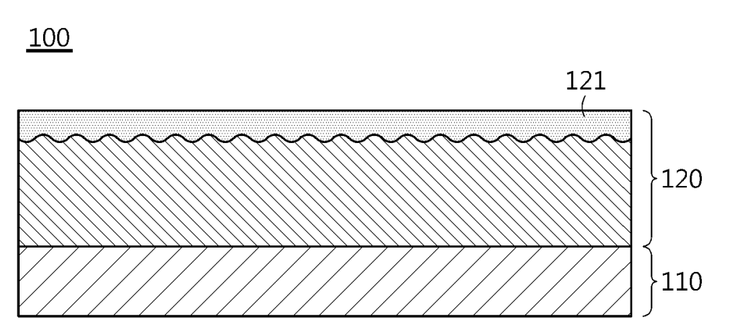
The FIGURE is a schematic sectional view illustrating the separator according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Unless otherwise stated, temperature is expressed in the unit of a Celsius degree, and content or content ratio is expressed on the weight basis.

The terms, 'top', 'bottom', 'left' and 'right' represent positions or directions in drawings to which reference is made, and are not used for limitary purposes.

Specific terms used in the following description are for the convenience of description and understanding, and the scope of the present disclosure is not limited thereto. Such terms include the above-listed words, derivatives thereof and synonyms thereof.

In one aspect, there is provided a separator for an electrochemical device. Herein, the electrochemical device is a system in which chemical energy is converted into electrical energy through electrochemical reactions, has a concept including a primary battery and a secondary battery, wherein the secondary battery is capable of charging and discharging and has a concept covering a lithium-ion battery, nickel-cadmium battery, nickel-hydrogen battery, or the like.

The separator according to the present disclosure functions as an ion-conducting barrier which allows ions to pass therethrough while interrupting an electrical contact between a negative electrode and a positive electrode. The separator has a plurality of pores formed therein, and the pores are interconnected preferably so that gases or liquids may pass from one surface of the substrate to the other surface of the substrate.

According to an embodiment of the present disclosure, the separator includes a porous separator substrate including a polymer material, and a porous coating layer formed on at least one surface of the substrate, wherein the porous coating layer includes inorganic particles and a binder resin. In the porous coating layer, the inorganic particles are bound to one another by means of the binder resin, and may have a porous structure including pores derived from the interstitial volumes formed among the inorganic particles.

In the separator according to the present disclosure, the inorganic particles in the porous coating layer are not aggregated or localized at a specific portion but show uniform distribution over the whole porous coating layer. Therefore, the separator according to the present disclosure has uniform porosity distribution over the whole separator, and thus shows a small deviation in electrolyte impregnation and ion conductivity over the whole separator.

The porous coating layer includes a binder resin and inorganic particles, has a plurality of micropores formed therein and interconnected with one another, and has porous structural characteristics allowing gases or liquids to pass from one surface to the other surface. According to an embodiment of the present disclosure, the porous coating layer includes the binder resin and the inorganic particles at a weight ratio of 50:50-1:99 (binder resin:inorganic particles). The ratio may be controlled suitably within the above-defined range. For example, the binder resin may be present in an amount of 50 wt % or less, 40 wt % or less, or 30 wt % or less, based on 100 wt % of the combined weight of the binder resin and the inorganic particles. In addition, the binder resin may be present in an amount of 1 wt % or more, 5 wt % or more, or 10 wt % or more, within the above-defined range. According to the present disclosure, the porous coating layer preferably has a porous structure with a view to ion permeability. According to an embodiment of the present disclosure, when the content of the binder resin is less than 1 wt %, the adhesion between the separator and an electrode is not sufficient. When the content of the binder resin is excessively high, porosity may be degraded, and the battery using the separator shows increased resistance to cause degradation of the electrochemical characteristics of the battery. According to the present disclosure, the binder resin may include a first binder resin and a second binder resin as described hereinafter. In addition, if necessary, the binder resin may further include a third binder resin.

According to an embodiment of the present disclosure, in the porous coating layer, the inorganic particles are bound to one another and integrated with one another by means of a binder resin, wherein the interstitial volumes among the inorganic particles may form pores. As used herein, 'interstitial volume' means a space defined by the inorganic particles facing each other substantially in a closely packed or densely packed structure of the inorganic particles.

According to an embodiment of the present disclosure, the porous coating layer may have a porosity of 40-70 vol %. Within the above-defined range, the porosity may be 40 vol % or more, or 45 vol % or more. In combination with this or independently from this, the porosity may be 70 vol % or less, or 65 vol % or less. Considering ion conductivity, i.e. in order to ensure a sufficient path through which ions can pass, the porosity may be controlled to 40 vol % or more. In addition, in order to ensure heat resistance and adhesiveness, the porosity may be controlled to 65 vol % or less. Therefore, considering such electrochemical characteristics, the porosity of the porous coating layer may be controlled suitably within the above-defined range.

Meanwhile, according to the present disclosure, the porous coating layer may have a total thickness controlled suitably within a range of 1-10 μm. The total thickness of the porous coating layer is the sum of the thicknesses of the porous coating layers formed on the surfaces of all sides of the separator substrate. If a porous coating layer is formed merely on one surface of the separator surface, the thickness of the porous coating layer may satisfy the above-defined range. If porous coating layers are formed on both surfaces of the separator substrate, the sum of the thicknesses of both porous coating layers may satisfy the above-defined range. When the thickness of the porous coating layer is less than 1 μm, it is not possible to obtain a sufficient effect of improving heat resistance due to an excessively small amount of inorganic particles contained in the porous coating layer. Meanwhile, when the thickness of the porous coating layer is excessively thicker than the above-defined range, the separator has a large thickness, thereby making it difficult to manufacture a thin battery and to improve the energy density of a battery.

Meanwhile, according to an embodiment of the present disclosure, the porous coating layer includes inorganic particles and a binder resin, and the binder resin includes a first binder resin and a second binder resin.

The first binder resin includes a fluorinated binder resin. The fluorinated binder resin may include a polyvinylidene fluoride (PVdF)-based polymer. Such a PVdF-based binder polymer is not particularly limited, but particular examples thereof may include polyvinylidene fluoride homopolymer, polyvinylidene fluoride-co-hexafluoropropylene, polyvinylidene fluoride-co-trichloroethylene, polyvinylidene fluoride-co-chlorotrifluoroethylene, or the like. At least one selected from the above PVdF-based polymers may be used. Besides the PVdF-based polymers, PVdF-based copolymers including a vinylidene fluoride repeating unit (A) and another repeating unit (B) copolymerizable with the repeating unit may be used. According to the present disclosure, the first binder resin imparts adhesion between an electrode and the separator. According to an embodiment of the present disclosure, the first binder resin preferably has a molecular weight (Mw) of 100,000 or more so that the binder resin may not be dissolved in an electrolyte after manufacturing a battery. Meanwhile, considering the solubility during the preparation of a polymer solution, the molecular weight may be 2,000,000 or less, 1,800,000 or less, 1,500,000 or less, or 1,000,000 or less.

According to the present disclosure, the second binder resin may include polyvinyl pyrrolidone (PVP). PVP functions as a dispersing agent during the preparation of a coating solution to contribute to formation of a uniform coating layer, and functions as a heat resistant binder to allow a separator to retain its shape at high temperature and to improve the heat resistance of the separator. In addition, PVP does not contribute to adhesion to an electrode, but contributes to binding force between a separator substrate and a porous coating layer, thereby providing improved peel strength. Considering heat resistance, PVP preferably has a molecular weight (Mw) of 500,000-5,000,000. According to an embodiment of the present disclosure, PVP may have a molecular weight (Mw) of 1,000,000-3,500,000.

According to the present disclosure, the term 'molecular weight' refers to weight average molecular weight (Mw). According to an embodiment of the present disclosure, the molecular weight (Mw) may be determined by using gel permeation chromatography (GPC). For example, 200 mg of a polymer resin to be analyzed is diluted in 200 mL of a solvent, such as tetrahydrofuran (THF), to prepare a sample having a concentration of about 1000 ppm, and the molecular weight may be determined by using an Agilent 1200 series GPC instrument at a flow rate of 1 mL/min through a refractive index (RI) detector.

According to an embodiment of the present disclosure, the second binder resin is used in an amount of 10-50 parts by weight based on 100 parts by weight of the first binder resin. When the content of the second binder resin is less than the above-defined range, it is not possible to obtain a sufficient effect of improving the heat resistance of a separator. Meanwhile, when the content of PVP is excessively high beyond the above-defined range, the content of the first binder resin in the porous coating layer is low to cause the problem of degradation of the binding force between an electrode and the separator.

In addition, besides the first binder resin and the second binder resin, the porous coating layer may further include at least one third binder resin selected from the group consisting of polyacrylonitrile, polyvinyl acetate, polyethylene-co-vinyl acetate, polyethylene oxide, polyarylate, cyanoethyl pullulan, cyanoethyl polyvinyl alcohol, cyanoethyl cellulose, cyanoethyl sucrose and pullulan. The third binder may be present in an amount of 10 wt % or less, 5 wt % or less, or 1 wt % or less, based on 100 wt % of the total weight of the binder resins.

According to an embodiment of the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5 V based on Li/Li$^+$) of operating voltage of an applicable electrochemical device. Particularly, when using inorganic particles having a high dielectric constant as inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, preferably 10 or more. Non-limiting examples of the inorganic particles having a dielectric constant of 5 or more may include at least one selected from the group consisting of $BaTiO_3$, $Pb(Zr,Ti)O_3$ (PZT), $Pb_{1-x}La_xZr_{1-y}Ti_yO_3$ (PLZT, wherein $0<x<1$, $0<y<1$), $Pb(Mg_{1/3}Nb_{2/3})O_3PbTiO_3$(PMN-PT), hafnia ($HfO_2$), $SrTiO_3$, $SnO_2$, $CeO_2$, MgO, $Mg(OH)_2$, NiO, CaO, ZnO, $ZrO_2$, $SiO_2$, $Y_2O_3$, $Al_2O_3$, SiC, $Al(OH)_3$, AlOOH and $TiO_2$.

In addition, inorganic particles having lithium-ion transportability, i.e. inorganic particles containing lithium elements, and not storing lithium but transport lithium ions, may be used as inorganic particles. Non-limiting examples of the inorganic particles having lithium ion transportability include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), such as $Li_{3.25}Ge_{0.25}P_{0.75}S_4$, lithium nitride ($Li_xN_y$, $0<x<4$, $0<y<2$), such as $Li_3N$, $SiS_2$-based glass ($Li_xSi_yS_z$, $0<x<3$, $0<y<2$, $0<z<4$), such as $Li_3PO_4$—$Li_2S$—$SiS_2$, and $P_2S_5$-based glass ($Li_xP_yS_z$, $0<x<3$, $0<y<3$, $0<z<7$), such as $LiI$—$Li_2S$—$P_2S_5$, or a mixture thereof.

Meanwhile, according to an embodiment of the present disclosure, the porous coating layer may include a heat-absorbing material as inorganic particles. Such a heat-absorbing material is less affected by the temperature applied during the formation of the porous coating layer or lamination (e.g. hot pressing) of the separator with an electrode, and thus can prevent degradation of the compressibility of the separator.

Particular examples of the heat-absorbing material include oxides and/or hydroxides containing at least one element selected from the group consisting of aluminum, magnesium, silicon, zirconium, calcium, strontium, barium, antimony, tin, zinc and rare earth elements, but are not limited thereto. More particularly, the metal oxides include alumina, aluminum peroxide, tin-zinc oxides ($Zn_2SnO_4$, $ZnSnO_3$), antimony trioxide ($Sb_2O_3$), antimony tetraoxide ($Sb_2O_4$), antimony pentaoxide ($Sb_2O_5$), or the like. The metal hydroxides include aluminum hydroxide ($Al(OH)_3$), magnesium hydroxide ($Mg(OH)_2$), zinc tin hydroxide ($ZnSn(OH)_6$), or the like.

In addition, aluminum hydroxide, a type of metal hydroxide, is decomposed into $Al_2O_3$ and water ($H_2O$) by absorbing heat at a temperature of 200° C. or higher. Herein, aluminum hydroxide absorbs a heat energy of about 1,000 J/g. In addition, magnesium hydroxide absorbs a heat energy of about 1,300 J/g. Therefore, metal hydroxide can assist an effect of preventing degradation of the shrinkage of a separator through endothermic reaction, as soon as heat corresponding to the above-mentioned heat energy is generated in an electrochemical device.

In addition, the inorganic particles may have an average diameter ($D_{50}$) of 10 nm to 1 μm. According to an embodiment of the present disclosure, the inorganic particles may have an average diameter ($D_{50}$) of 700 nm or less, 500 nm or less, 300 nm or less, or 100 nm or less, within the above-defined range. According to the present disclosure, even when the inorganic particles have a small average diameter ($D_{50}$) of 500 nm or less, 300 nm or less, or 100 nm or less, the binder composition according to the present disclosure provides improved dispersibility, allows formation of a coating layer having a uniform thickness and ensures suitable porosity. Meanwhile, when the particles have an average diameter ($D_{50}$) of less than 10 nm, the inorganic particles have an excessively large surface area to cause degradation of dispersibility of the inorganic particles in slurry for forming a porous coating layer during the preparation of the slurry. Meanwhile, as the particle diameter of the inorganic particles is increased, the mechanical properties of the separator may be degraded. Therefore, it is preferred that the particle diameter of the inorganic particles does not exceed 1 μm. Particularly, considering the effect of improving heat resistance, the particle diameter of the inorganic particles may be preferably 500 nm or less, or 300 nm or less, and particularly 100 nm or less.

According to an embodiment of the present disclosure, the particle diameter ($D_{50}$) of the inorganic particles refers to an integrated value at 50% from the side of smaller particles calculated based on the results of determination of the particle size distribution of particles after classification using a particle size analyzer used conventionally in the art. Such particle size distribution can be determined by a diffraction or scattering intensity pattern generated upon the contact of light with the particles. As a particle size distribution analyzer, Microtrac 9220FRA or Microtrac HRA available from Nikkiso may be used.

Meanwhile, according to the present disclosure, the inorganic coating layer is provided with an electrode adhesive portion 121 having a high content of binder resin on the surface thereof by virtue of the characteristics of the method for manufacturing the separator as described hereinafter. The FIGURE is a schematic view illustrating the sectional structure of the separator 100 according to an embodiment of the present disclosure. Referring to the FIGURE, the separator according to the present disclosure includes a porous coating layer 120 formed on the surface of a separator substrate 110, wherein the binder resin is distributed at a higher concentration at the top layer portion of the inorganic coating layer as compared to the other portions. For the convenience of description, the top layer portion in which the binder resin is distributed at a higher concentration will be referred to as 'electrode adhesive portion 121' hereinafter. According to an embodiment of the present disclosure, the electrode adhesive portion results from the migration of the binder resin toward the top layer portion through a process, such as humidified phase separation. Therefore, the electrode adhesive portion is not a structure separated physically from the inorganic coating layer but is bound integrally and indivisibly to the surface of the inorganic coating layer as a part of the inorganic coating layer. In addition, the thickness of the electrode adhesive portion may not be uniform, since the electrode adhesive portion is a product resulting from humidified phase separation. According to an embodiment of the present disclosure, the electrode adhesive portion may be defined as a portion containing the binder resin in an amount of 70 wt % or more, preferably 85 wt % or more, from the topmost portion in the thickness direction of the inorganic coating layer. Meanwhile, although the FIGURE shows a porous coating layer formed on only one surface of a separator substrate, porous coating layers may be formed on both surfaces of the separator substrate. In addition, when porous coating layers are formed on both surfaces of the separator surface, each porous coating layer may be provided with an electrode adhesive portion at the top layer portion thereof.

As described above, the separator according to the present disclosure includes a porous separator substrate including a polymer material. The separator substrate may be a porous film including a polymer resin, such as a porous polymer film made of a polyolefin material. The separator substrate may be molten at least partially, when the battery temperature is increased, and thus blocks the pores to induce shut-down.

According to an embodiment of the present disclosure, the separator substrate may have a porosity of 40-70 vol %. For example, the porosity may be 42 vol % or more, 45 vol % or more, 50 vol % or more, or 55 vol % or more, within the above-defined range. In addition, the porosity may be 60 vol % or less, 55 vol % or less, or 55 vol % or less, within the above-defined range. For example, the porosity may be 40-65 vol %.

According to the present disclosure, the term 'porosity' means a volume occupied by pores based on the total volume of a structure, is expressed in the unit of percentage (%), and may be used exchangeably with the terms, such as pore ratio, porous degree, or the like. According to the present disclosure, the method for determining porosity is not particularly limited. According to an embodiment of the present disclosure, the porosity may be determined by the Brunauer-Emmett-Teller (BET) method using nitrogen gas or Hg porosimetry and according to ASTM D-2873. Further, the net density of a separator may be calculated from the density (apparent density) of the separator and the compositional ratio of ingredients contained in the separator and density of each ingredient, and the porosity of the separator may be calculated from the difference between the apparent density and the net density.

Meanwhile, the pores of the separator substrate may have a diameter of about 10-70 nm based on the largest pore diameter. Within the above-defined range, the pores may have a diameter of 65 nm or less, or 60 nm or less. Considering the improvement of resistance characteristics of the separator, the separator preferably has a uniform pore size and uniform pore size distribution in the separator. Therefore, according to the present disclosure, when the pore diameter satisfies the above-defined range and the separator has a uniform pore size and pore size distribution, the separator may show excellent resistance characteristics. Meanwhile, according to an embodiment of the present disclosure, the separator substrate may have a mean pore size of 15-50 nm. Within the above-defined range, the mean pore size may be 20 nm or more, 25 nm or more, or 30 nm or more, and 40 nm or less, or 35 nm or less. For example, the separator substrate may have a mean pore size of 30-35 nm.

Meanwhile, according to an embodiment of the present disclosure, the pore size, pore size distribution and mean pore size (nm) may be determined by using a capillary flow porometer. The capillary flow porometer is based on the process including wetting the pores of a separator with a liquid having a known surface tension, and applying pneumatic pressure thereto to measure the bubble point (max pore) where the initial flux is generated. Particular examples of the capillary flow porometer include CFP-1500-AE available from Porous Materials Co., or the like.

According to the present disclosure, the separator substrate may have a thickness of 5-14 µm in terms of the thin filming and high energy density of an electrochemical device. According to an embodiment of the present disclosure, the separator substrate may have a thickness of 11 µm or more, considering the mechanical properties and/or conductive barrier function. In addition, the separator substrate may have a thickness of about 14 µm or less, considering the thin filming and/or resistance of a separator. For example, the separator substrate may have a thickness controlled suitably in a range of 11-14 µm.

According to an embodiment of the present disclosure, the separator may include a polymer resin having electrical insulation property. Meanwhile, the separator substrate preferably includes a thermoplastic resin with a view to imparting a shutdown function to the separator. As used herein, 'shutdown function' means a function of a polymer resin which melts to block the pores of the separator substrate and to interrupt ion transport, thereby preventing a thermal runaway of a battery. In this viewpoint, the separator substrate preferably includes a polyolefin-based polymer resin having a melting point of less than 200° C. For example, the polyolefin-based polymer resin may include at least one selected from polyethylene, polypropylene and polypentene. According to an embodiment of the present disclosure, the separator substrate may preferably include polyethylene in an amount of 90 wt % or more, such as 100 wt %.

Particularly, polyethylene may refer to ultrahigh-molecular weight high-density polyethylene (UHMWHDPE), high-molecular weight polyethylene (HMWPE), high-density polyethylene (HDPE), low-density polyethylene (LDPE), homogeneous and linear low-density polyethylene (LLDPE), or the like. For example, polyethylene may include at least one of them. Herein, 'high-molecular weight polyethylene (HMWPE)' refers to a polyethylene having a weight average molecular weight of about 100,000-1,000,000. In addition, 'ultrahigh molecular weight' refers to a molecular weight (Mw) of larger than about 1,000,000 to about 7,000,000. According to the present disclosure, polyethylene may have a molecular weight (Mw) of 200,000-1,000,000, such as 200,000-500,000.

Meanwhile, according to an embodiment of the present disclosure, the separator substrate may further include at least one of polymer resins including polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene, if necessary, for improving durability, or the like.

According to an embodiment of the present disclosure, the separator substrate may be a porous polymer film obtained by the method as described hereinafter, and may be a sheet of monolayer film or a multilayer film formed by lamination of two or more sheets. When two or more sheets are laminated, each layer preferably has the above-described characteristics in terms of its ingredients.

Next, the method for manufacturing the separator according to an embodiment of the present disclosure will be explained.

The method for manufacturing the separator according to the present disclosure includes the steps of:

(S100) preparing a first polymer solution and a second polymer solution;

(S200) mixing the first polymer solution with the second polymer solution to prepare a third polymer solution, and introducing inorganic particle(s) to the third polymer solution to prepare slurry for forming a porous coating layer; and (S300) applying the slurry for forming a porous coating layer to at least one surface of a separator substrate, followed by drying, to obtain a separator including a porous separator substrate and a porous coating layer formed on at least one surface thereof.

Hereinafter, the method will be explained in more detail.

First, a first polymer solution and a second polymer solution are prepared. The first polymer solution is prepared by dissolving a first binder resin in a first solvent, while the second polymer solution is prepared by dissolving a second binder resin in a second solvent. Herein, reference will be made to the above description about the first binder resin and the second binder resin. According to an embodiment of the present disclosure, each of the first polymer solution and the second polymer solution may independently has a concentration of binder resin of about 1-10 wt %.

According to an embodiment of the present disclosure, the first solvent can dissolve the first binder resin, and is a non-solvent for the second binder resin. The first solvent may be one capable of dissolving the first binder resin to 5 wt % or more, preferably 15 wt % or more, and more preferably 25 wt % of more at 25° C. In addition, the first solvent is a non-solvent for the second binder resin, and the second binder resin shows a solubility of less than 5 wt % in the first solvent at 25° C. Non-limiting examples of the first solvent include any one selected from ketone solvents, such as acetone, methyl ethyl ketone (MEK), methyl isobutyl ketone (MIBK), or the like, or a mixture of two or more of them.

Meanwhile, the second solvent can dissolve the second binder resin, and is a non-solvent for the first binder resin. The second solvent may be one capable of dissolving the second binder resin to 5 wt % or more, preferably 15 wt % or more, and more preferably 25 wt % of more at 25° C. In addition, the second solvent is a non-solvent for the first binder resin, and the first binder resin shows a solubility of less than 5 wt % in the second solvent at 25° C. Non-limiting examples of the second solvent include at least one selected from water, methanol, ethanol, propyl alcohol, butyl alcohol, butanediol, ethylene glycol, propylene glycol and tripropylene glycol.

Once the first and the second polymer solutions are prepared, they are mixed suitably to prepare a third polymer solution. The content of the first and the second binder reins in the resultant third polymer solution is 67-91 wt % of the first binder resin and 9-33 wt % of the second binder resin based on 100 wt % of the total weight of the first and the second binder resins. Meanwhile, inorganic particles are introduced to the third polymer solution to prepare slurry for forming a porous coating layer. The resultant slurry may have a solid content, except the first and the second solvents, of 10-30 wt %.

Meanwhile, the binder resin and the inorganic particles are present in the slurry for forming a porous coating layer at a weight ratio of 50:50-1:99 (binder resin:inorganic particles), wherein the binder resin includes the first binder resin and the second binder resin. Meanwhile, if necessary, the binder resin may further include less than 10 wt % of the third binder resin as described above.

Next, the slurry is applied to the surface of the separator substrate, and the resultant product is allowed to stand under a relative humidity of about 40-80% for a predetermined time so that the binder resin may be solidified (dried). Herein, phase separation of the binder resin is induced. During the phase separation, the solvent migrates toward the surface portion of the inorganic coating layer and the binder resin migrates toward the surface portion of the inorganic coating layer along with the migration of the solvent. In this manner, the content of the binder resin on the top layer portion of the porous coating layer is increased. Then, the portion of the inorganic coating layer below the top layer portion of the porous coating layer is provided with porous property, while pores are formed from the interstitial volumes among the inorganic particles. Herein, the first binder for which the second solvent, such as water or ethanol, functions as its non-solvent floats toward the surface through the humidified phase separation, and thus the first binder is distributed in a large amount on the surface. Then, the binder layer contributes to formation of adhesion to an electrode. The first binder and the second binder are present together in the porous coating layer and assist the binding between a coated substrate and a coating layer, and binding of the inorganic particles in the coating layer.

After that, the resultant separator is dried to form a porous coating layer integrally on the separator surface.

The slurry may be applied through a conventional coating process, such as Meyer bar coating, die coating, reverse roll coating, gravure coating, or the like. When forming the porous coating layers on both surfaces of the separator surface, the coating solution may be applied to a single surface sequentially, and then humidified phase separation and drying may be carried out. However, it is preferred in terms of productivity that the coating solution is applied to both surfaces of the separator substrate at the same time, and then humidified phase separation and drying are carried out.

Meanwhile, the separator according to the present disclosure may also be obtained by fabricating a porous coating layer and a separator substrate individually, laminating those sheets with each other, and forming a composite through hot adhesion or by using an adhesive. To obtain a porous coating layer as an independent sheet, the slurry may be applied to a release sheet, a porous coating layer is formed in the above-described manner, and then only the porous coating layer may be peeled from the release sheet.

According to the present disclosure, the content ratio of the inorganic particles to the binder in the slurry for forming a porous coating layer is the same as defined above, and may be controlled suitably considering the thickness, pore size and porosity of the resultant porous coating layer.

The drying step is carried out by setting the temperature and time conditions suitably so that generation of surface defects on the surface of the composite porous layer may be minimized. The drying step may be carried out by using a drying-aid device, such as a drying oven or hot air.

In still another aspect of the present disclosure, there is provided a secondary battery including the separator. The battery includes a positive electrode, a negative electrode and a separator interposed between the positive electrode and the negative electrode, wherein the separator is the low-resistance separator having the above-described characteristics.

According to the present disclosure, the positive electrode includes a positive electrode current collector, and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0 < x \leq 1$; $1 \leq y \leq 3$; $1 \leq z \leq 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P, acetylene black, Ketjen black, channel black, furnace black, lamp black, thermal black, denka black, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan, and carboxymethyl cellulose.

The electrode assembly prepared as described above may be introduced to a suitable casing and an electrolyte may be injected thereto to obtain a battery.

According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), and mixtures thereof. However, the present disclosure is not limited thereto.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Porosity and Gurley Value

According to the present disclosure, porosity may be determined based on ASTM D-2873. Gurley values can be determined by using Gurley type Densometer (No. 158) available from Toyoseiki Co., according to the method of JIS (Japanese Industrial Standard) Gurley. In other words, the Gurley value means a time (second) required for 100 mL of air to pass through a porous substrate or separator having a size of 1 in$^2$ under a constant air pressure of 4.8 inches.

Particle Size Distribution

The average particle diameter of inorganic particles means the particle size ($D_{50}$) of 50% of the integrated value from a smaller particle diameter calculated based on the results of measurement of particle size distribution of the particles after the classification thereof using a conventional particle size distribution measuring system. For example, such particle size distribution can be determined after dispersing the inorganic particles sufficiently in aqueous solution by using a suitable laser diffraction scattering type particle size distribution measuring system, followed by agitation with an ultrasonic dispersing device.

Examples 1-3. Manufacture of Separator Including Porous Coating Layer

PVDF-HFP (first binder resin, Mw 300,000-400,000) was introduced to acetone to prepare a first polymer solution having a concentration of binder of 5 wt %, and PVP (Mw 2,000,000-3,000,000) was introduced to ethanol to prepare a second polymer solution having a concentration of binder of 5 wt %. Next, the first polymer solution was mixed with the second polymer solution to prepare a third polymer solution. Then, inorganic particles were introduced to the prepared third polymer solution and dispersed therein to prepare slurry for forming a porous coating layer. The solid content (first binder resin, second binder resin and inorganic particles) of each slurry, except the solvent, was 12 wt %, and the weight ratio of the inorganic particles to the binder resins (first binder resin and second binder resin) was 70:30. The slurry was mixed by using a paint shaker for about 2 hours. The slurry was applied to both surfaces of a polymer film made of polyethylene (thickness: about 9 μm, porosity: about 40-45 vol %, air permeation time: 60 s/100 cc to 80 s/100 cc) through a dip coating process and dried under a relative humidity of 45% to obtain a separator. The drying was carried out at room temperature for about 10 minutes. In each separator, the thickness of porous coating layers was about 6 μm on both surfaces.

Comparative Example 1

PVDF-HFP (Mw 2,000,000-3,000,000) as a first binder resin was introduced to acetone to prepare a polymer solution. Then, inorganic particles were introduced to the prepared polymer solution and dispersed therein to prepare slurry for forming a porous coating layer. The solid content (first binder resin and inorganic particles) of the slurry, except the solvent, was 12 wt %, and the weight ratio of the inorganic particles to the first binder resin was 70:30. The slurry was mixed by using a paint shaker for about 2 hours. The slurry was applied to both surfaces of a polymer film made of polyethylene (thickness: about 9 μm, porosity: about 40-45 vol %, air permeation time: 60 s/100 cc to 80 s/100 cc) through a dip coating process and dried under a relative humidity of 45% to obtain a separator. The drying was carried out at room temperature for about 10 minutes. In each separator, the thickness of porous coating layers was about 6 μm on both surfaces.

Comparative Example 2

PVDF-HFP (Mw 300,000-400,000) and PVP (Mw 2,000,000-3,000,000) were was introduced to NMP at a weight ratio of 25:5 to prepare a polymer solution having a concentration of 5 wt %. Then, inorganic particles were introduced to the prepared polymer solution and dispersed therein to prepare slurry for forming a porous coating layer. The solid content (first binder resin, second binder resin and inorganic particles) of the slurry, except the solvent, was 12 wt %, and the weight ratio of the inorganic particles to the binder resins (first binder resin and second binder resin) was 70:30. The slurry was mixed by using a paint shaker for about 2 hours. The slurry was applied to both surfaces of a polymer film made of polyethylene (thickness: about 9 μm, porosity: about 40-45 vol %, air permeation time: 60 s/100 cc to 80 s/100 cc) through a dip coating process and dried under a relative humidity of 45% to obtain a separator. The drying was carried out at room temperature for about 10 minutes. In each separator, the thickness of porous coating layers was about 6 μm on both surfaces.

Determination of Adhesion to Electrode

A negative electrode was prepared as follows. A negative electrode active material (graphite), a conductive material (super P) and a binder (CMC/SBR mixed at a weight ratio of 1:1) were introduced to a solvent (water) at a weight ratio (wt %) of 97.5:1.5:1, followed by mixing (2000 rpm, 30 minutes), to prepare negative electrode slurry. The prepared negative electrode slurry was coated on copper film having a thickness of 20 μm by using a doctor blade and dried overnight at 110° C. The positive electrode was controlled to a thickness of about 100-110 μm, and pressing was carried out by using a roll press to a final thickness of about 60-70 μm. The prepared electrode was allowed to stand in a vacuum drier at 80° C. for 4 hours. Then, the separator obtained from each of Examples 1 and 2 and Comparative Examples 1-3 was laminated with the negative electrode to prepare a separator-negative electrode laminate specimen. Each laminate specimen was prepared with a size of 2.5 cm×10 cm. A double-sided tape available from 3M Co. was attached to slide glass, and each specimen was attached thereto in such a manner that the separator side of each specimen might face the double-sided tape. A UTM (universal testing machine) was used under the conditions of 10 N load cell and 180° mode at a speed of 300 mm/min.

Determination of Peel Strength (Peel Adhesion)

The peel strength between a separator substrate and an inorganic coating layer was determined under the following conditions. Each of the separator specimens obtained from Examples 1 and 2 and Comparative Examples 1-3 was prepared with a size of 1.5 cm×10 cm. A double-sided tape available from 3M Co. was attached to slide glass, and each specimen was attached to the double-sided tape. A UTM was used under the conditions of 10 N load cell and 180° mode at a speed of 300 mm/min.

Determination of Heat Shrinkage

Each of the separators obtained from Examples and Comparative Examples was cut into a square shape of 5 cm×5 cm. The length of each separator was measured in the machine direction (MD) and the transverse direction (TD) based on the separator substrate, and each separator was allowed to stand in an oven at 150° C. under a load-free state for 30 minutes. Then, each separator was removed from the oven, and the length in the machine direction (MD) and the length in the transverse direction (TD) were measured. The heat shrinkage in each of the machine direction (MD) and the transverse direction (TD) was calculated according to the following Formula 1:

Heat shrinkage (%)=[(Length before shrinking−Length after shrinking)/Length before shrinking]×100   [Formula 1]

Determination of Air Permeability

An air permeability measuring system (available from Asahi Seiko, Trade name: EG01-55-1MR) was used to determine the time (sec) required for 100 mL of air to pass through a separator under a constant pressure (0.05 MPa). Each sample was tested at three points, 1 point at each of the left/center/the right, and the average value was recorded.

TABLE 1

|  | Composition (wt %) | Heat shrinkage (%) (MD/TD) | Adhesion to electrode (gf/25 mm) | Air permeability (s/100 mL) | Peel strength (gf/15 mm) |
|---|---|---|---|---|---|
| Example 1 | Inorganic particles (AlOOH, $D_{50}$:40 nm):PVdF-HFP:PVP = 70:27:3 | 2/1 | 80 | 121 | 107 |
| Example 2 | Inorganic particles (AlOOH, $D_{50}$:40 nm):PVdF-HFP:PVP = 70:25:5 | 1/1 | 85 | 123 | 142 |
| Example 3 | Inorganic particles (AlOOH, $D_{50}$:40 nm):PVdF-HFP:PVP = 70:20:10 | 1/0 | 76 | 148 | 208 |
| Comp. Ex. 1 | Inorganic particles (Al(OH)$_3$, $D_{50}$:800 nm):PVdF-HFP = 70:30 | 55/49 | 82 | 133 | 123 |
| Comp. Ex. 2 | Inorganic particles (AlOOH, $D_{50}$:40 nm):PVdF-HFP:PVP = 70:25:5 | 1/1 | 5 | 1726 | 215 |

Examples 1-3 show an effect of improving heat shrinkage. In addition, in the case of Examples 1-3, each separator shows excellent results in terms of adhesion to an electrode, heat resistance (heat shrinkage) and air permeability values. Meanwhile, in the case of Comparative Example 1 using the first binder resin alone, the separator shows high adhesion to an electrode, but shows degradation of heat shrinkage as compared to Examples. In addition, in the case of Comparative Example 2 using the first binder resin and the second binder resub but merely using N-methyl pyrrolidone (NMP) as a solvent capable of dissolving the two binder resins, no phase separation of the first binder resin toward the surface occurs, resulting in significantly low adhesion. Moreover, in the case of Comparative Example 2, the binder resins infiltrate into the separator surface and block the pore structure, resulting in significant degradation of air permeability.

What is claimed is:

1. A method for manufacturing a separator for an electrochemical device, comprising the steps of:
   preparing a first polymer solution and a second polymer solution;
   mixing the first polymer solution with the second polymer solution to prepare a third polymer solution, and adding inorganic particles to the third polymer solution to prepare slurry for forming a porous coating layer; and
   applying the slurry for forming the porous coating layer to at least one surface of a porous separator substrate, drying the porous coating layer, to obtain the separator including the porous separator substrate and the porous coating layer on at least one surface of the porous separator substrate,
   wherein the first polymer solution comprises a first binder resin and a first solvent,
   wherein the first binder resin has a molecular weight (Mw) of 100,000-2,000,000,
   wherein the second polymer solution comprises a second binder resin and a second solvent, and
   wherein the first binder resin comprises a fluorinated binder resin, the second binder resin comprises polyvinyl pyrrolidone (PVP), the first solvent is a non-solvent for the second binder resin, and the second solvent is a non-solvent for the first binder resin.

2. The method for manufacturing the separator for the electrochemical device according to claim 1, wherein the fluorinated binder resin comprises a polyvinylidene fluoride (PVdF)-containing polymer, and the PVdF-containing polymer binder resin comprises at least one selected from the group consisting of polyvinylidene fluoride homopolymer, polyvinylidene fluoride-co-hexafluoropropylene, polyvinylidene fluoride-co-trichloroethylene and polyvinylidene fluoride-co-chlorotrifluoroethylene.

3. The method for manufacturing the separator for the electrochemical device according to claim 1, wherein the first solvent comprises a ketone-containing solvent.

4. The method for manufacturing the separator for the electrochemical device according to claim 1, wherein the second solvent comprises at least one selected from the group consisting of water, methanol, ethanol, propyl alcohol, butyl alcohol, butanediol, ethylene glycol, propylene glycol and tripropylene glycol.

5. The method for manufacturing the separator for the electrochemical device according to claim 1, wherein the first binder resin has a molecular weight (Mw) of 100,000-1,800,000.

6. The method for manufacturing the separator for the electrochemical device according to claim 1, wherein the slurry for forming the porous coating layer comprises a weight ratio of the binder resin to the inorganic particles of 50:50 to 1:99, and the binder resin comprises the first binder resin and the second binder resin.

7. The method for manufacturing the separator for the electrochemical device according to claim 1, wherein the slurry for forming the porous coating layer further comprises at least one third binder resin selected from the group consisting of polyacrylonitrile, polyvinyl acetate, polyethylene-co-vinyl acetate, polyethylene oxide, polyarylate, cyanoethyl pullulan, cyanoethyl polyvinyl alcohol, cyanoethyl cellulose, cyanoethyl sucrose and pullulan.

8. The method for manufacturing the separator for the electrochemical device according to claim 1, wherein the second binder resin has a molecular weight (Mw) of 500,000-5,000,000.

9. The method for manufacturing the separator for the electrochemical device according to claim 1, wherein the inorganic particles have a diameter ($D_{50}$) of 10 nm to 1 μm.

10. The method for manufacturing the separator for the electrochemical device according to claim 1, wherein the drying is carried out at a relative humidity of 40% to 80%.

\* \* \* \* \*